(12) United States Patent
Kaltenbach

(10) Patent No.: US 9,399,458 B2
(45) Date of Patent: Jul. 26, 2016

(54) METHOD FOR OPERATING A DRIVE TRAIN

(71) Applicant: ZF Friedrichshafen AG, Friedrichshafen (DE)

(72) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 114 days.

(21) Appl. No.: 14/338,389

(22) Filed: Jul. 23, 2014

(65) Prior Publication Data

US 2014/0335996 A1 Nov. 13, 2014

Related U.S. Application Data

(62) Division of application No. 13/289,173, filed on Nov. 4, 2011, now Pat. No. 8,808,137.

(30) Foreign Application Priority Data

Nov. 24, 2010 (DE) .......................... 10 2010 061 823

(51) Int. Cl.
*F16H 63/50* (2006.01)
*B60W 20/00* (2016.01)
(Continued)

(52) U.S. Cl.
CPC ................. *B60W 20/10* (2013.01); *B60K 6/48* (2013.01); *B60W 10/06* (2013.01); *B60W 10/08* (2013.01); *B60W 10/113* (2013.01); *B60W 30/19* (2013.01); *F16H 63/50* (2013.01); *F16H 63/502* (2013.01); *B60K 2006/4825* (2013.01);
(Continued)

(58) Field of Classification Search
CPC ........................ Y10T 477/677; F16H 2306/42
See application file for complete search history.

(56) References Cited

U.S. PATENT DOCUMENTS 2,673,474 A * 3/1954 Boyce ..................... F02D 29/02
477/101
4,355,550 A * 10/1982 Will ....................... F02D 41/023
477/102
(Continued)

FOREIGN PATENT DOCUMENTS

| DE | 198 50 549 A1 | 5/2000 |
| DE | 100 43 420 A1 | 4/2001 |
| DE | 103 08 692 A1 | 9/2003 |
| DE | 10 2008 000 343 A1 | 8/2009 |
| JP | 2006132562 A | 5/2006 |

OTHER PUBLICATIONS

German Search Report Corresponding to 10 2010 061 823.3 mailed Feb. 4, 2011.

*Primary Examiner* — Sherry Estremsky
(74) *Attorney, Agent, or Firm* — Davis & Bujold PLLC; Michael J. Bujold

(57) ABSTRACT

A method of operating a drive train of a motor vehicle comprising a drive assembly which has at least a combustion engine and an automatic transmission with frictional shift elements positioned between the drive assembly and an output. When executing a traction downshift in which at least one frictional shift element of the automatic transmission is engaged and at least one shift element of the automatic transmission is disengaged, the method comprising the steps of engaging at least a first frictional shift element of the automatic transmission, disengaging at least a second frictional shift element of the automatic transmission, and reducing torque, provided by the combustion engine, while reducing the transfer ability of the second frictional shift element for executing the traction downshift.

7 Claims, 4 Drawing Sheets

(51) Int. Cl.
*B60K 6/48* (2007.10)
*B60W 10/06* (2006.01)
*B60W 10/08* (2006.01)
*B60W 10/113* (2012.01)
*B60W 30/19* (2012.01)
*B60W 10/04* (2006.01)
*B60W 10/11* (2012.01)
*B60W 50/00* (2006.01)
*F16H 59/66* (2006.01)

(52) U.S. Cl.
CPC ............... *B60W 10/04* (2013.01); *B60W 10/11* (2013.01); *B60W 20/00* (2013.01); *B60W 50/0097* (2013.01); *B60W 50/0098* (2013.01); *B60W 2510/08* (2013.01); *B60W 2550/143* (2013.01); *B60W 2550/146* (2013.01); *B60W 2550/22* (2013.01); *B60W 2710/0666* (2013.01); *B60W 2710/083* (2013.01); *B60W 2710/1005* (2013.01); *F16H 59/66* (2013.01); *F16H 2306/42* (2013.01); *Y02T 10/6221* (2013.01); *Y02T 10/6252* (2013.01); *Y02T 10/6291* (2013.01); *Y10S 903/902* (2013.01); *Y10T 477/26* (2015.01); *Y10T 477/677* (2015.01); *Y10T 477/688* (2015.01)

(56) References Cited

U.S. PATENT DOCUMENTS

| | | | |
|---|---|---|---|
| 4,770,064 A * | 9/1988 | Kuerschner | F02D 41/022 477/109 |
| 5,101,687 A * | 4/1992 | Iwatsuki | B60W 10/06 477/109 |
| 5,133,227 A * | 7/1992 | Iwatsuki | B60W 10/06 477/101 |
| 5,603,672 A | 2/1997 | Zhang | |
| 5,822,708 A * | 10/1998 | Wagner | B60W 10/06 477/109 |
| 6,468,182 B1 | 10/2002 | Brandt et al. | |
| 6,712,734 B1 | 3/2004 | Loeffler | |
| 6,929,581 B2 * | 8/2005 | Sugimura | B60W 10/11 477/102 |
| 6,941,830 B2 | 9/2005 | Ibamoto et al. | |
| 7,094,176 B2 | 8/2006 | Budal et al. | |
| 7,121,978 B2 * | 10/2006 | Murakami | B60W 10/115 477/109 |
| 7,226,379 B2 | 6/2007 | Ibamoto et al. | |
| 7,247,126 B2 * | 7/2007 | Shim | F16H 61/061 475/123 |
| 2002/0033059 A1 | 3/2002 | Pels et al. | |
| 2003/0054920 A1 * | 3/2003 | Berger | B60W 10/02 477/70 |
| 2010/0261577 A1 | 10/2010 | MacFarlane et al. | |

* cited by examiner

METHOD FOR OPERATING A DRIVE TRAIN

This application is a divisional of U.S. patent application Ser. No. 13/289,173, which claims priority from German patent application Ser. No. 10 2010 061 823.3 filed Nov. 24 2010.

FIELD OF THE INVENTION

The invention relates to a method for operating a drive train of a motor vehicle, in particular of a hybrid vehicle.

BACKGROUND OF THE INVENTION

Drive trains of motor vehicles having a drive assembly, and an automatic transmission with frictionally engaging shift elements being positioned between the drive assembly and an output, in which power is lost during the execution of shifts under load, are commonly known in the state of the art. In this case, the DE 198 50 549 A1 teaches a drive train of a hybrid vehicle having a drive assembly that comprises a combustion engine and an electric machine, wherein an automatic transmission is positioned between the drive assembly and an output, and is designed as a double clutch transmission, and wherein the clutches of a double clutch of a double clutch transmission serve as friction shift elements during the execution of shifts under load.

In a construction of load shift devices, especially in the construction of the traction upshifts or traction downshifts, such a drive train, with the use of frictional shift elements of the automatic transmission, creates a loss of power at the frictional contacts. Such a power loss which has to be absorbed by the frictional shift elements which results in on one hand an increased wear of the shift elements, on the other hand, unnecessary gasoline consumption. Thus, there is a need for methods of operating a drive train having an automatic transmission that comprises frictional load shift elements through which power loss can be lowered at the frictional shift elements to reduce on one hand the wear of the frictional shift elements and on the other hand to reduce the consumption of gasoline.

SUMMARY OF THE INVENTION

Based on the above, the objective of the present invention is to create a novel method for the operating of a drive train of a motor vehicle, especially of a hybrid vehicle in which the power loss at the frictional shift elements is reduced and the gasoline consumption is lowered.

In a first aspect of the invention, the task is solved with a method, which the torque is provided by the combustion engine is reduced during the execution of the traction upshift at least during the process of engaging the frictional shift elements.

In a second aspect of the invention, the task is solved with a method in, which the torque is provided by the combustion engine is reduced during a traction downshift, at least during the process of disengaging the frictional shift elements.

With the above inventive method, the power loss at the frictional shift elements of an automatic transmission can be reduced during a traction upshift, as well as during the process of a traction downshift. Hereby, the mechanical stress and thus the wear of the tractional shift elements, which serve as load shift elements, can be reduced. In addition, the consumption of gasoline of the motor vehicle can be lowered.

When a drive train of a hybrid vehicle comprises an electrical machine in addition to the combustion engine, during the process of a traction upshift or traction downshift, the electrical machine does not affect the output during the process of shifting and the involved traction shift elements of the automatic transmission, the reduction of the torque provided by the combustion engine is at least partially compensated by torque provided by the electric machine. When the invention is applied to a drive train of a hybrid vehicle, where the electric machine does not affect the output via the load shift elements which are involved in the process of shifting, the electric machine can at least partially compensate for the reduction of torque from the combustion engine.

The process of a traction upshift or traction downshift, during the reduction of torque from the combustion engine, only takes place if defined conditions are met, either by itself or in a combination.

Thus, it is proposed to only allow the reduction of torque, which is provided by the combustion engine, during the process of a traction upshift or traction downshift only when a drive situation of the motor vehicle and/or a traffic situation of the motor vehicle allows a reduction of the torque provided by the combustion engine.

It is proposed to only allow the reduction of torque, which is provided by the combustion engine, for the process of a traction upshift or traction downshift only when a target gear of the traction upshift or traction downshift is a relatively high gear of the automatic transmission.

It is proposed to only allow the reduction of torque provided by the combustion engine for the traction upshift or traction downshift when actuation of a drive pedal by the driver is lower than a threshold value.

BRIEF DESCRIPTION OF THE DRAWINGS

Further preferred embodiments of the invention are shown in the dependent claims and the following description. Example embodiments of the invention are explained with reference to the drawings, but not limited thereby. They show:

DETAILED DESCRIPTION OF THE PREFERRED EMBODIMENTS

The present invention concerns a method for operating a drive train of a motor vehicle.

Figure 1:
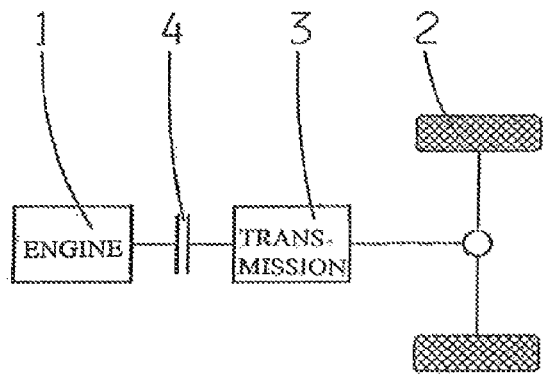
FIG. 1 a schematic view of a first drive train in which the inventive method can be applied.

FIG. 1 shows a drive train of a motor vehicle with a combustion engine 1, an output 2, and an automatic transmission 3 which is connected between the combustion engine 1 and the output 2.

The automatic transmission comprises of a plurality of frictional shift elements which can be designed as clutches or brakes. A separation clutch 4 is connected between the combustion engine 1 and the automatic transmission 3.

When a shift under load, especially a traction upshift or traction downshift is executed in such drive train, the process of shifting involves the engagement of at least one frictional shift element of the automatic transmission 3 and the disengagement at least one frictional shift element of the automatic transmission 3.

Figure 5:
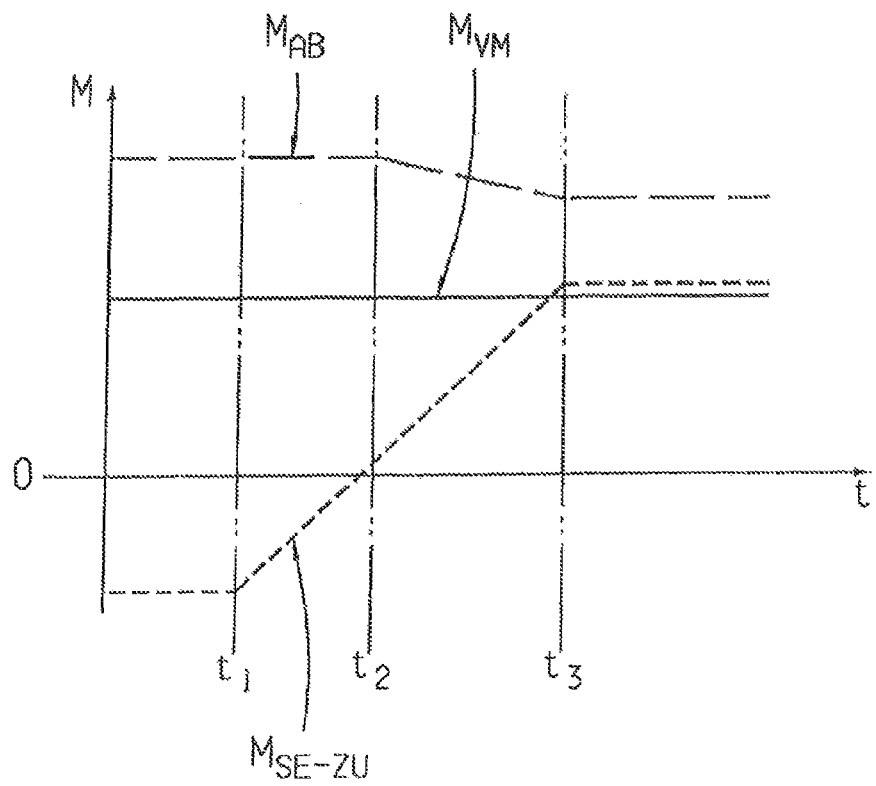
FIG. 5 a diagram to explain the state of the art in and execution of a traction upshift.

FIG. 5 shows the execution of a conventional traction upshift in such a drive train, wherein FIG. 5 shows the progression of several torques, over the time t, namely on one hand a torque progression $M_{VM}$ for torque which is provided by the combustion engine 1, a torque progression $M_{AB}$ for torque which is present at the output 2, and a torque progression $M_{SE-ZU}$ in a traction type upshift, for engaging a frictional shift element of the transmission 3.

Execution of the traction upshift starts at the time point t1, wherein the frictional shift element engages between the time points t1 and t2, beginning from a completely disengaged condition up to the so-called engagement point where it is completely engaged. Thus, the so-called engagement of the frictional shift element being engaged takes place between time points t1 and t2, where during its engagement no significant torque is transferred. The engagement or rather the engagement procedure of the shifting element is also called free travel, and is for example shown in FIG. 5 as a negative torque in during the engagement of shift elements being engaged.

At time t2, the engagement of the shifting element being engaged is completed. Between the time points t2 and t3, a load transfer takes place by engaging shifting element of the automatic transmission 3 and by further increasing the transmission ability of the same, up to a point where it can transfer the torque $M_{VM}$ provided by the combustion engine 2. As can be seen in FIG. 5, the effective torque $M_{AB}$ at the output 2 is reduced during the load transfer between the time points t2 and t3. Between the time points t2 and t3, a power is lost when engaging the shifting element.

Now to decrease the power loss during the process of the traction upshift, it is proposed in a first aspect of the invention to reduce the torque provided by the combustion engine 1 in the process of a traction upshift at least during the engagement or rather the process of engaging the frictional shifting element being engaged. Thus in accordance with the invention, the torque $M_{VM}$ provided by the combustion engine 1 is reduced at least between the time points t1 and t2, wherein an advantageous further embodiment of the invention provides that the reduction of the torque $M_{VM}$ provided by the combustion engine and thus the effective torque $M_{AB}$ at the output, starts simultaneously with the beginning of the engagement or rather the process of engaging the shift element to be engaged, meaning at the time point t1. Since a reduced combustion engine torque $M_{VM}$ is already present at the time point t2, the power loss can be reduced.

Figure 8:
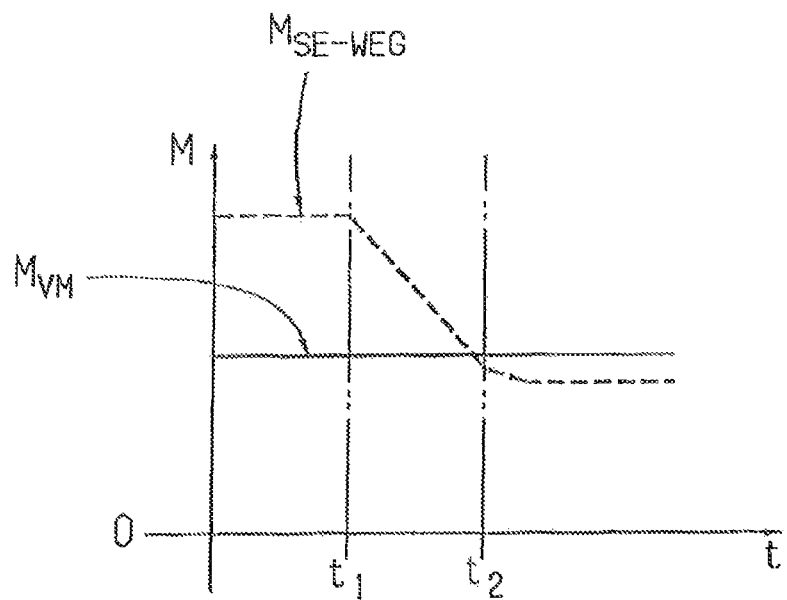
FIG. 8 a diagram to explain the state of the art during the execution of a traction downshift.

FIG. 8 illustrates the procedure, known in the state of the art, of executing a traction downshift, wherein FIG. 8 shows over the time t, on one hand, the torque $M_{VM}$ provided by the combustion engine 1 and, on the other hand, the torque $M_{SE-WEG}$ being transferred by the shift element of the automatic transmission 3 being disengaged.

FIG. 8 shows that during the process of the conventional traction downshift which starts at the time point t1, beginning at time point t1, the transfer ability of the shift element being disengaged is reduced, wherein at the time point t2 the transfer ability of the shift element being disengaged equals the torque $M_{VM}$ provided by the combustion engine 1, and at the time point t2 the shift element being disengaged starts to slip.

Thus, at the time point t2, the distinct shift phase of the traction downshift starts and a loss of power occurs at the shift element.

It is proposed in a second aspect of the invention to reduce the loss of power during the execution of a traction downshift by lowering the torque $M_{VM}$ provided by the combustion engine 1, and at least during the lowering or rather the lowering procedure of the transfer ability of the frictional shift elements being disengaged, preferably until it slips, and in an advantageous further embodiment of this aspect of the invention, at the beginning of lowering the transfer ability of the frictional shift elements being disengaged, meaning at the time point t1, the torque $M_{VM}$ provided by the combustion engine 1 is reduced. Thus, it is guaranteed that the torque $M_{VM}$ provided by the combustion engine 1, is already reduced at the time point t2, at which the shift element being disengaged starts to slip, so that hereby the power loss can be reduced.

Figure 2:
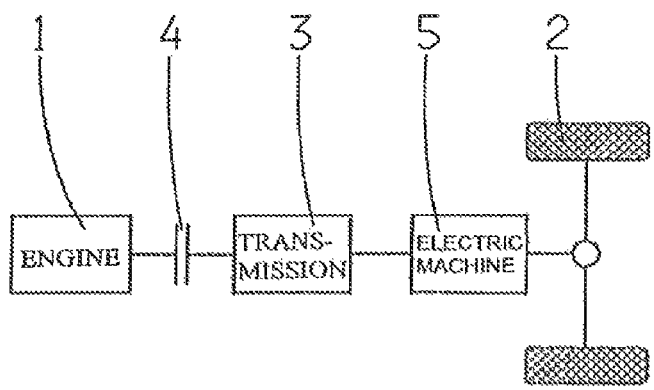
FIG. 2 a schematic view of a second drive train in which the inventive method can be applied.
Figure 4:
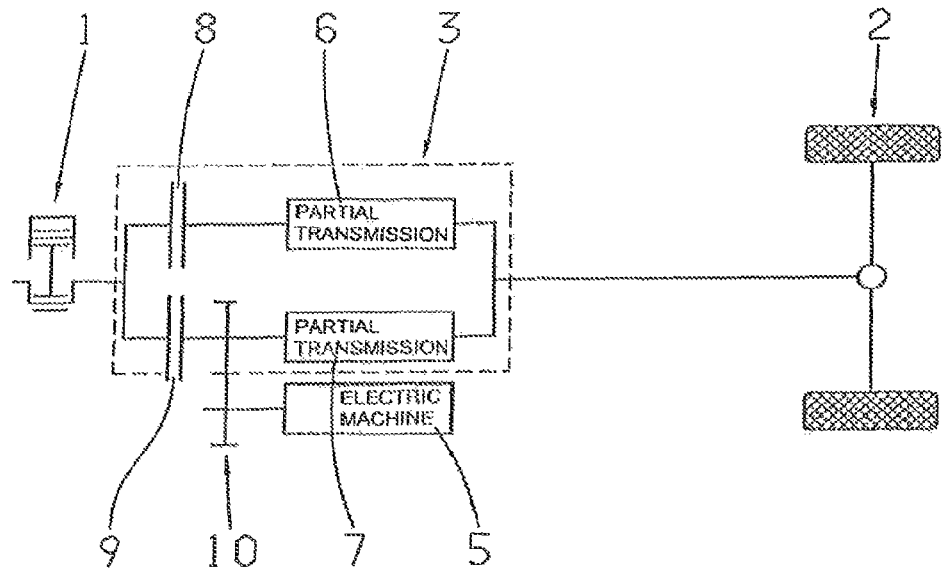
FIG. 4 a schematic view of a fourth drive train in which the inventive method can be applied.

Additional details of the preferred application of the invention are described with regard to a drive train of a hybrid vehicle having drive assembly that comprises an electric machine in addition to the combustion engine 1. FIGS. 2 and 4 each schematically show a drive train a hybrid vehicle in which the drive train comprises an electric machine 5 in addition to the combustion engine 1.

In FIG. 2, the electric machine 5 is positioned between the automatic transmission 3 and the output 2, so that the electric machine 5 constantly acts on the output 2, without a flow of force via the shift elements of the automatic transmission 3.

Figure 3:
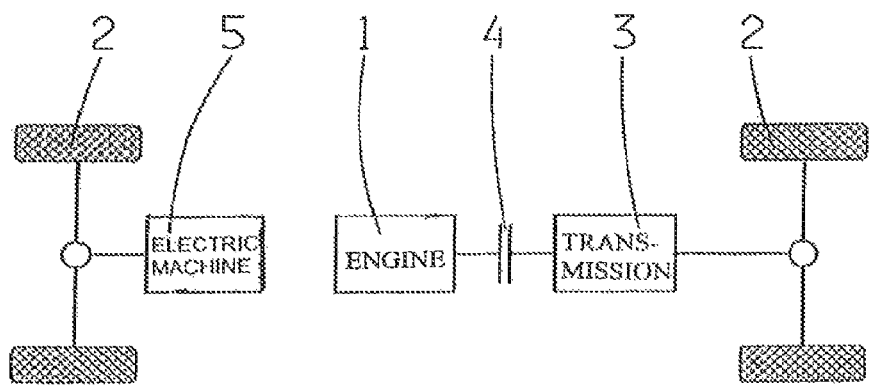
FIG. 3 a schematic view of a third drive train in which the inventive method can be applied.

Also in a drive train of a hybrid vehicle in FIG. 3, the electric machine 5 constantly acts on the output 2, without any flow of force via the shift elements of the automatic transmission 3, wherein the drive train in FIG. 3 is designed as a so-called axle hybrid, in which the electric machine 5 of the drive assembly acts upon a different axle of the output 2 than of the combustion engine 1.

In a drive train of a hybrid vehicle in accordance with FIG. 4, the automatic transmission 3 is designed as double clutch transmission with two partial transmissions 6 and 7, wherein the combustion engine 1 can be connected, via a load shift clutch 8, to the input shaft of the partial transmission 6 and, via an additional load shift clutch 9, to the input shaft of the partial transmission 7. The electric machine 5 of the drive assembly is assigned to one of the two partial transmissions, namely the partial transmission 7, in a way so that the electric machine 5 is connected to the input shaft to the partial transmission 7 via a spur gear stage 10. Also in the drive train in FIG. 4, the electric machine 5 can act upon the output 2 by bypassing the frictional load shift elements which are involved in shifting, namely via bypassing the load shift elements of the transmission 3 which are designed as load shift clutches 8 and 9.

Figure 6:
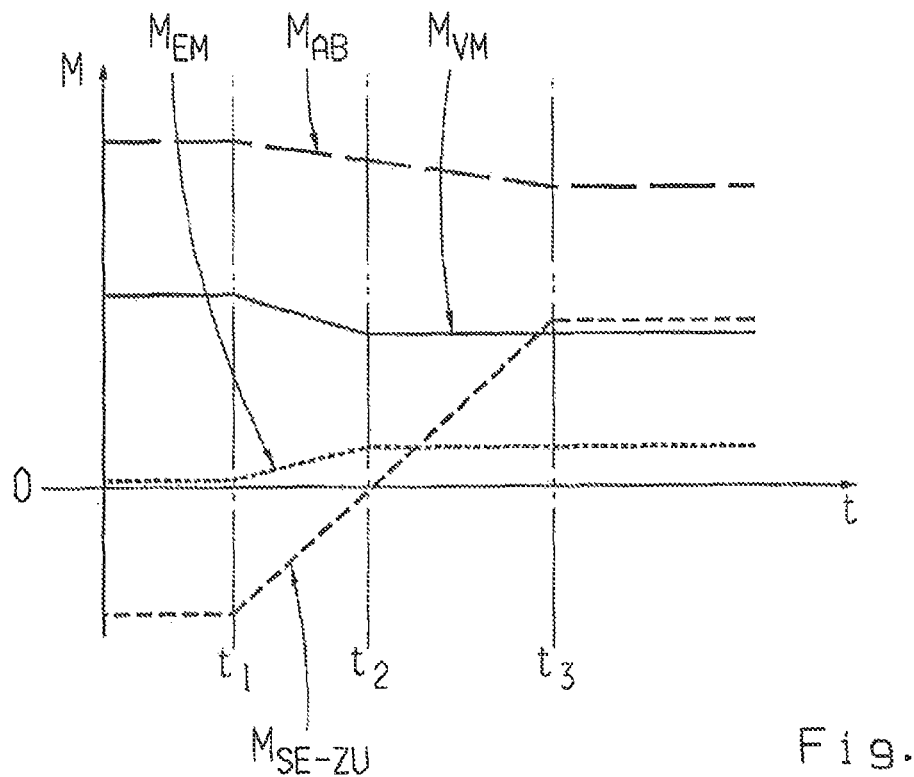
FIG. 6 a diagram to explain a first variation of the invention during the execution of a traction upshift.
Figure 7:
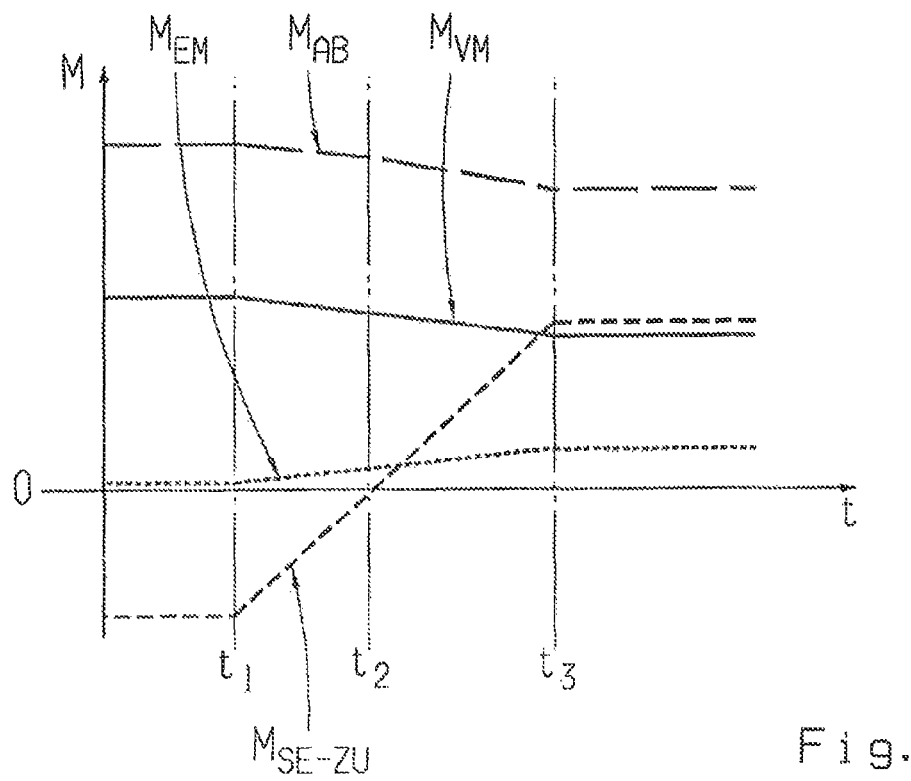
FIG. 7 a diagram to explain a second variation of the invention during the execution of a traction upshift.

FIGS. 6 and 7 clarify the embodiment of an inventive traction upshift of a drive train of a hybrid vehicle, in which the electric machine 5 does not act upon the output 2 via the involved load shift elements of the automatic transmission 3 during execution of the traction upshift.

FIGS. 6 and 7 show four torque progressions over time t, these being a torque progression of the torque $M_{VM}$ provided by the combustion engine 1, a torque progression of the torque $M_{EM}$ provided by the electric machine 5, a torque progression of the effective torque $M_{AB}$ at the output 2, and a torque progression of the torque $M_{SE-ZU}$ being transferred by engaging frictional shift elements of the transmission 3 during execution of the traction upshift.

It is assumed in FIGS. 6 and 7 that a traction upshift is executed in the drive train of FIG. 4, namely a traction upshift from a current gear in the partial transmission 6 to a target gear in the partial transmission 7, during such a shift, the frictional shift element being engaged is the load shift clutch 9, and the gear ratio of the target gear in the partial transmission 7 is lower than the gear ratio of the current gear in the partial transmission 6.

FIG. 6 shows a variation of the Invention in which, exclusively during the engagement of the frictional shift elements being engaged, meaning between the time points t1 and t2, the torque $M_{VM}$ provided by the combustion engine, is reduced.

Reduction of the torque $M_{VM}$ provided by the combustion engine, which causes a reduction of the effective torque $M_{AB}$ at the output, starts preferably simultaneously with the engagement procedure of the shift element being engaged, wherein, in accordance with FIG. 6 and between the time points t1 and t2, not only is the torque $M_{VM}$ provided by the combustion engine 1 being reduced, but also the torque $M_{EM}$ provided by the electric machine 5 is increased so that the reduction of the torque $M_{VM}$ provided by the combustion engine 1 is at least partially compensated.

In the variation in FIG. 6, the reduction of the torque $M_{VM}$ provided by the combustion engine 1, as well as the increase of the torque $M_{EM}$ provided by the electric machine 5 exclusively takes place between the time points t1 and t2 and thus exclusively during the engagement of the shift element being engaged, namely each simultaneously starting with the engagement procedure of the frictional shift element being engaged and therefore beginning at the time t1.

Thus, in the variation in FIG. 6, at least the partial transfer of torque provided by the combustion engine 1 to the electric machine 5 and thus, the partial transfer from the combustion engine 1 of the electric machine 5, is terminated at the time point t2.

When the engagement procedure of the shift element being engaged is completed, the torque $M_{VM}$ provided by the combustion engine 1, and the torque $M_{EM}$ provided by the electric machine 5, does not change in the variation as shown in FIG. 6.

The increase of the torque $M_{EM}$ provided by the electric machine 5 is limited by the maximum amount of torque that can be provided thereby, the maximum amount of torque that can be provided by the electric machine 5 is determined by load and the temperature of the energy storage, which is connected to the electric machine 5.

With the invention through a proper drive design and the dimensioning of the electric machine 5, in comparison to a conventional configuration, the frictional torque and the power loss at the shift element being engaged in the load upshift can be reduced in a hybrid drive train in such a way that the effective torque at the output 2 does not decline.

In addition, the amount of time required for the shift can be reduced because the load shift through the shift element being engaged between the time intervals t2 and t3 can take place faster, because the lowered torque of the combustion engine 1 can be reached earlier by the shift element being engaged.

Through the decrease of the load shifting phase, which is defined by the time points t2 and t3, the power loss at the shift element can be reduced in addition.

In FIG. 6, the torque $M_{EM}$ provided by the electric machine 5 to the shaft of the shift element being engaged is independent of the location at which the electric machine 5 is actually linked with a drive train. Thus, gear ratios are taken into consideration in FIG. 6, from the shaft of the electric machine 5 to the shaft of the shift element being engaged. In the drive train as shown in FIG. 4, that gear ratio is just the gear ratio of the spur gear stage 10, through which the electric machine 5 is linked to the shaft of the clutch 9. In the drive train in FIG. 3, meaning in an axle hybrid, these gear ratios would be comprised of the axle ratios and transmission ratios.

In accordance with FIG. 6, the effective torque $M_{AB}$ at the output decreases already between the time points t1 and t2, because the torque of the electric machine 5 is generated in relationship with the engaging clutch and the gear ratio of the target gear in the executed traction upshift is lower than the gear ratio of the current gear.

FIG. 7 shows another embodiment of the method in FIG. 6, in which the load shift or rather the load transfer from the combustion engine 1 to the electric machine 5 is not terminated at the time point t2, but instead at the time point t3.

Therefore, it can be seen in FIG. 7 that the torque $M_{VM}$ provided by the combustion engine 1 is reduced between the time points t1 and t3, and that the torque $M_{EM}$ provided by the electric machine 5 is increased between the time points t1 and t3. In FIG. 7, at least a partial transfer of the torque provided by the combustion engine 1 to the electric machine 5 is thus terminated at the time when the shift element being engaged is engaged, or rather its transfer ability has been increased to the point such that the shift element being engaged can transfer all of the torque $M_{VM}$ provided by the combustion engine 1.

The advantage of the variation in FIG. 7 in comparison to the variation in FIG. 6, is the fact that in the variation in FIG. 7 the load shift or rather the load transfer takes place slower from the combustion engine 1 through the electric machine 5, so that possible deviations of the actual torques of the electric machine 5 and the combustion engine 1 have a lower impact during the shift.

Figure 9:
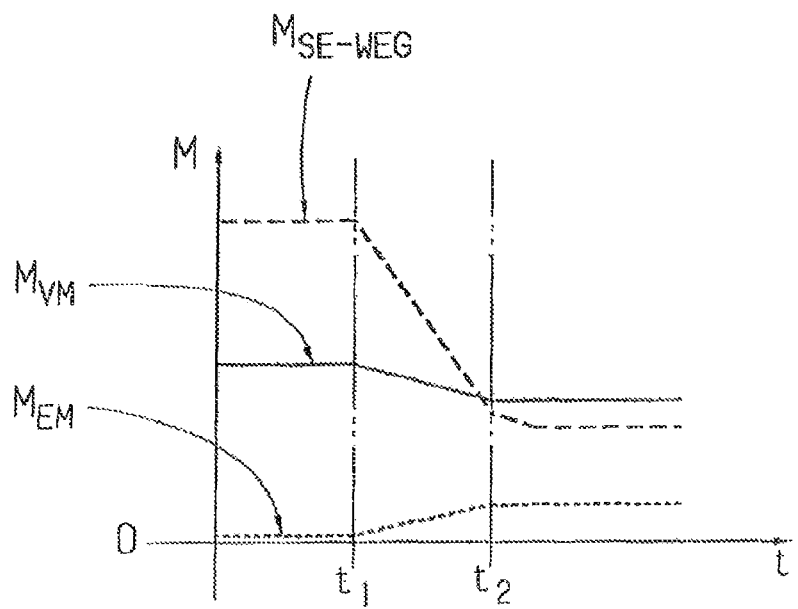
FIG. 9 a diagram to explain an additional variation of the invention during the execution of a traction downshift.

FIG. 9 illustrates an embodiment of a traction downshift according to the invention in a drive train of a hybrid vehicle, whereby FIG. 9 shows that between the time points t1 and t2, meaning during the reduction of the transfer ability of the frictional shift element being disengaged and its slippage at the time point t2, on one hand, the torque $M_{VM}$ provided by the combustion engine 1 is reduced, on the other hand the torque $M_{EM}$ provided by the electric machine 5 is increased. This increase and reduction of the torques $M_{VM}$ and $M_{EM}$ takes place in FIG. 9 again simultaneously with the start of the reduction or rather the reduction procedure of the transfer ability of the shift element being disengaged, thus it begins at the time point t1. The increase as well as the reduction of the torques $M_{VM}$ and $M_{EM}$ terminates at the time point t2, meaning when the frictional shift element being disengaged starts slipping.

At the end of the executed traction upshift or traction downshift, respectively, at least a partial transfer of the load from the combustion engine 1 to the electric machine 5 in each hybrid drive train is reversed in a way so that, with the termination of the executed shifting, the load of the respective electric machine 5 directed to the respective combustion engine 1 is redirected by again increasing the torque $M_{VM}$ provided by the combustion engine 1, and again reducing the torque $M_{EM}$ provided by the electric machine 5.

In an extreme case, during the execution of an inventive traction upshift or in the inventive traction downshift, the torque provided by the combustion engine 1 can be completely eliminated, wherein at that time, related to the combustion engine 1, a shift is made to interrupt the traction force and the drive torque and traction force at the output are exclusively provided by the respective electric machine 5.

The inventive shifts are only important for traction shifting, meaning for traction upshifts and traction downshifts. For thrust upshifts, however, the inventive method is not of importance because a combustion engine does not consume gasoline during a no-thrust situation.

Thus, the shifts, meaning traction upshifts and traction downshifts can be executed and are characterized by the fact that the effective torque $M_{AB}$ at the output, and in comparison to conventionally executed shifts, is lowered to reduce the power loss. This can be applied to pure combustion engine based drive assemblies as well as to hybrid drives.

In accordance with an additional aspect of this present invention, traction upshift or traction downshifts with a lowered shift operation, meaning by reduction of the torque $M_{VM}$ provided by the combustion engine or the effective torque $M_{AB}$ at the output, respectively, are executed only when one or a combination of defined conditions are met.

A first such condition can be a defined drive situation of the motor vehicle. It can be decided to only allow the lowered shift operation if the motor vehicle is not driving through curves with an increased lateral acceleration and/or an uphill drive.

An additional such condition can be based on the traffic situation which the motor vehicle is operated in. It can be provided that the lowered shift operation is only possible if the motor vehicle is not merging into a rotary and/or is not drive in the fast lane for merging purposes and/or is not in a passing operation.

In an additional condition, it can be an operating mode or rather a drive mode of the motor vehicle. It can be therefore provided that the lowered shift operation is only allowed while operating the motor vehicle in a so-called Eco-operating mode which either automatically or by activation of an operating element initiates an operating mode of the motor vehicle with reduced gasoline consumption.

In addition, it can also be provided to only allow the lowered shift operation if a target gear, in the executed traction upshift or traction downshift, is a relatively high gear of the automatic transmission.

It can therefore be provided that the lowered shift operation is only allowed if the target gear in the intended shift execution is one of the last three gears, preferably the last two gears, of the automatic transmission.

It can be provided in a 7-gear transmission to only allow the lowered shift operation during a shift into the fifth, sixth, or seventh gear of the 7-gear transmission. This variation of the invention is based on the knowledge that with an intended shift to a relatively small, lower target gear, an lowered shift operation can be interfering because of the fact that lower target gears, in general, apply to drive situations at intersections, in a rotary, or when turning.

It can further be provided to only allow the lowered shift operation, while executing a traction upshift or traction downshift, when the amount of a driver actuates a drive pedal or rather a throttle of the drive train is smaller than a threshold value.

It can be provided in a further advantageous advancement of this aspect of the invention to automatically notify the driver of the execution of a traction upshift or traction downshift by establishing an actuating counterforce at the throttle. In this advancement, the execution of a traction option of the traction downshift is announced through an actuator which is assigned to the drive pedal, by means of establishing a counterforce at the drive pedal. Depending on how of the driver reacts to the announcement at the drive pedal, the lowered shift operation can either be allowed or not be allowed. Thus, it can be provided that at the time when the driver, in reaction to the counterforce at the drive pedal, reduces significantly the drive pedal activation, the lowered shift operation in the intended execution of a traction upshift or traction downshift will be allowed.

To the contrary, if the driver reduces the drive pedal actuation only by a small amount or not at all, the lowered shift operation will not be allowed or rather will be suppressed.

Therefore, the driver can influence, by way of actuating the drive pedal, the execution of a shift, meaning the activation or deactivation of the lowered shift operation, and can therefore decide whether or not to cause a traction force decrease or rather reduction of the output torque $M_{AB}$ which is effective at the output 2.

REFERENCE CHARACTERS

1 Combustion Engine
2 Output
3 Transmission
4 Separation Clutch
Electric Machine
6 Partial Transmission
7 Partial Transmission
8 Load Shift Clutch
9 Load Shift Clutch
10 Spur Gear Stage

The invention claimed is:

1. A method of operating a drive train of a motor vehicle comprising a drive assembly which has at least a combustion engine and an automatic transmission, and the automatic transmission having frictional shift elements positioned between the combustion engine and an output for executing a traction downshift in which at least one frictional shift element of the automatic transmission is engaged and at least one shift element of the automatic transmission is disengaged, the method comprising:
   engaging at least a first frictional shift element of the automatic transmission;
   disengaging at least a second frictional shift element of the automatic transmission; and
   simultaneously reducing torque provided by the combustion engine and starting a reduction of a transfer ability of the second frictional shift element for executing the traction downshift.

2. The method according to claim 1, wherein the drive assembly comprises an electric motor in addition to the combustion engine and the method further comprising:
   at least reducing the torque provided by the combustion engine while reducing the transfer ability of the second frictional shift element and while executing the traction downshift without the electric motor having an impact on the output via the frictional shift elements of the automatic transmission which are involved in the traction downshift; and
   increasing torque provided by the electric machine to at least partially compensate for the reduction of the torque provided by the combustion engine.

3. The method according to claim 2, further comprising with the start of reducing the transfer ability of the second frictional shift element, simultaneously starting at least a partial relocation of the torque provided by the combustion engine to the electric machine.

4. A method of operating a drive train of a motor vehicle comprising a drive assembly which has at least a combustion engine and an automatic transmission, and the automatic transmission having frictional shift elements positioned between the combustion engine and an output, the method comprising:
   executing one of a traction upshift and a traction downshift by reducing torque provided by the combustion engine only if at least one of a drive situation of the motor vehicle and a traffic situation of the motor vehicle allows reducing the torque provided by the combustion engine, when the drive situation is not either driving uphill or on a curve and when the traffic situation is not either entering into a rotary or passing another vehicle.

5. A method of operating a drive train of a motor vehicle comprising a drive assembly which has at least a combustion engine and an automatic transmission, the automatic transmission having frictional shift elements positioned between the combustion engine and an output, the method comprising the step of:

executing one of a traction upshift and a traction downshift by reducing torque provided by the combustion engine only when a target gear of the traction upshift or the traction downshift is one of a last three gears of the automatic transmission.

6. A method of operating a drive train of a motor vehicle comprising:

a drive assembly which has at least a combustion engine and an automatic transmission, and the automatic transmission having frictional shift elements positioned between the combustion engine and an output, the method comprising:

executing one of a traction upshift and a traction downshift by reducing torque provided by the combustion engine only when a driver actuates a drive pedal by an amount lower than a threshold.

7. The method according to claim 6, further comprising automatically announcing to the driver, the execution of the one of the traction upshift or the traction downshift, by creating an actuation counter force at the drive pedal;

when the driver reduces the drive pedal actuation either not at all or insignificantly, then maintaining the torque provided by the combustion engine; and when the driver reduces the drive pedal actuation significantly, then reducing the torque provided by the combustion engine for executing the shift.

\* \* \* \* \*